US008661291B2

(12) United States Patent
Li et al.

(10) Patent No.: US 8,661,291 B2
(45) Date of Patent: Feb. 25, 2014

(54) DIAGNOSING A FAULT INCIDENT IN A DATA CENTER

(75) Inventors: Xin Hui Li, Beijing (CN); Ying Li, Beijing (CN); Tian Cheng Liu, Beijing (CN); Ying Liu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 396 days.

(21) Appl. No.: 13/013,925

(22) Filed: Jan. 26, 2011

(65) Prior Publication Data

US 2011/0191630 A1 Aug. 4, 2011

(30) Foreign Application Priority Data

Jan. 29, 2010 (CN) .......................... 2010 1 0105002

(51) Int. Cl.
*G06F 11/00* (2006.01)
(52) U.S. Cl.
USPC .............................................. 714/26; 714/48
(58) Field of Classification Search
USPC ..................................................... 714/26, 48
See application file for complete search history.

(56) References Cited

U.S. PATENT DOCUMENTS

| 7,096,459 | B2 * | 8/2006 | Keller et al. ................... 717/124 |
| 7,526,670 | B2 | 4/2009 | Lloyd et al. |
| 7,996,719 | B2 * | 8/2011 | Bernabeu-Auban et al. ... 714/26 |
| 8,332,690 | B1 * | 12/2012 | Banerjee et al. ................. 714/26 |
| 8,392,760 | B2 * | 3/2013 | Kandula et al. ................. 714/26 |
| 2004/0225381 | A1 | 11/2004 | Ritz et al. |
| 2005/0210132 | A1 | 9/2005 | Florissi et al. |
| 2006/0117091 | A1 | 6/2006 | Justin |
| 2008/0201350 | A1 | 8/2008 | Thattil |

FOREIGN PATENT DOCUMENTS

| CN | 101146304 A | 3/2008 |
| CN | 101226499 A | 7/2008 |

OTHER PUBLICATIONS

Casati et al., "Business-Oriented Management of Web Services," Service-Oriented Computing, Communications of the ACM, Oct. 2003, vol. 46, No. 10, pp. 55-60.
Xu et al., "Mining Console Logs for Large-Scale System Problem Detection," http://www.usenix.org/events/sysml08/tech/full_papers/xu/xu.pdf, Dec. 2008.

\* cited by examiner

*Primary Examiner* — Yolanda L Wilson
(74) *Attorney, Agent, or Firm* — Winstead, P.C.

(57) ABSTRACT

A method, computer program product and apparatus for diagnosing a fault incident in a data center. A determination is made as to whether a fault incident happened in the data center. If a fault incident happened, then the business logic being executed in a node where the fault incident happened is determined. The log files associated with the execution process of the business logic is selected based on a management model corresponding to the data center, where the management model reflects the deployment and application dependency of the business logics. The fault incident is diagnosed based on the log files. The management model is utilized to select the log files associated with the execution process of the business logic, and to write information of the business logic and dependency relationships between the applications into the log file, so as to automatically, rapidly and accurately diagnose the fault incident.

25 Claims, 5 Drawing Sheets

DIAGNOSING A FAULT INCIDENT IN A DATA CENTER

CROSS-REFERENCE TO RELATED APPLICATIONS

This application claims priority under 35 U.S.C. §119(a) from Chinese Patent Application No. 201010105002.9, filed on Jan. 29, 2010, the contents of which are incorporated herein by reference.

TECHNICAL FIELD

The present invention relates to fault diagnosis technology, and in particular, to diagnosing fault incidents in a data center (e.g., a distributed data center).

BACKGROUND

Management of a data center involves incident management. As capacity of the data center increases, physical machines, in which various applications, services, operating systems and the like reside, may be distributed at different geographical locations. In this case, remote incident management also becomes an important part of the data center management. When a fault incident happens in the data center, the fault incident will be diagnosed so as to provide a fault solution.

In an existing method for diagnosing fault incidents, an administrator of the data center employs a "test check" methodology to check each application, service and the like in the data center according to log files to find out a cause of the fault incident. However, as a user of the data center, the administrator of the data center can not be fully aware of the deployment in the data center and the dependency relationships between the applications and between the services, which would thus cause problems of low efficient and time-consuming fault incident diagnosis, or even not being able to determine the cause of the fault accurately. Further, for the distributed data center, since the physical machines may be located at different geographical locations, it would cause the time for fault incident diagnosis to be lengthy.

Additionally, when the fault incident happened in the data center, if a topology of the data center has changed, for example, a new virtual machine is created, it is also prone to result in error diagnosis.

Therefore, there is a need for a technical solution for automatically, rapidly and accurately diagnosing fault incidents in the data center.

BRIEF SUMMARY

In one embodiment of the present invention, a method for diagnosing a fault incident in a data center comprises monitoring whether a fault incident happened in the data center. The method further comprises determining a business logic being executed in a node where the fault incident happened in response to the fault incident happening in the data center. Additionally, the method comprises selecting log files associated with an execution process of the business logic based on a management model corresponding to the data center, the management model reflecting deployment and application dependency of business logics in the data center. In addition, the method comprises diagnosing, by a processor, the fault incident based on the log files.

Other forms of the embodiment of the method described above are in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE SEVERAL VIEWS OF THE DRAWINGS

A better understanding of the present invention can be obtained when the following detailed description is considered in conjunction with the following drawings, in which.

DETAILED DESCRIPTION

It is believed that the above and other objects, features and advantages of the present invention will be more apparent from the following detailed description of the embodiments of the present invention in conjunction with the accompany drawings.

Figure 1:
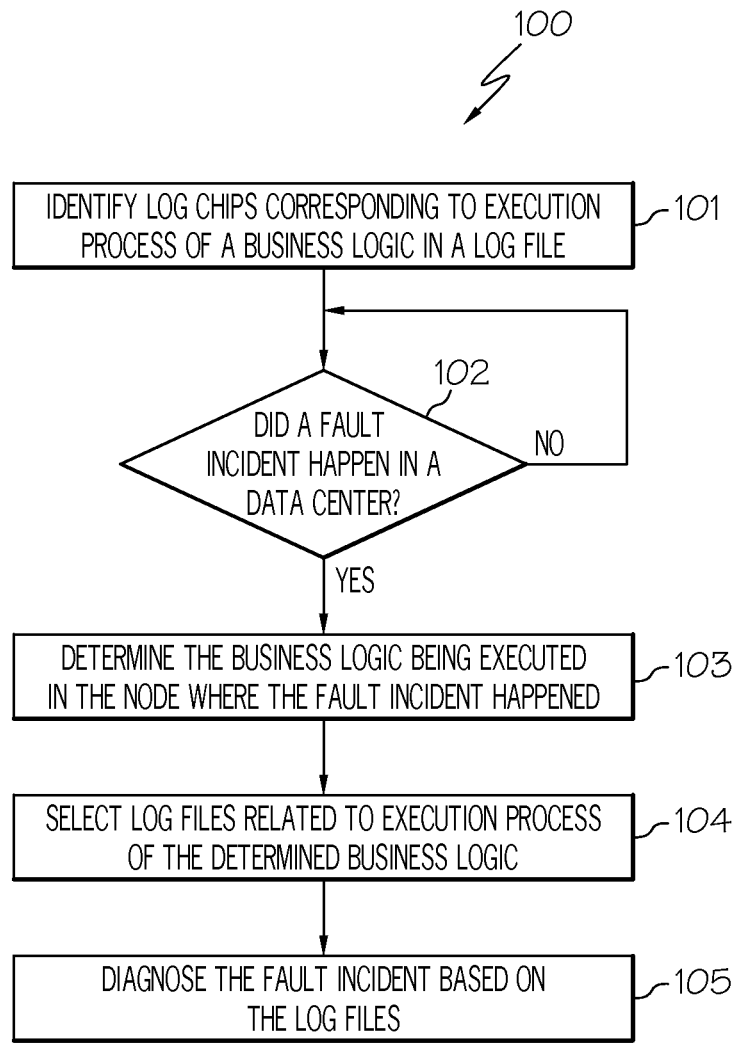
FIG. 1 is a flowchart of a method for diagnosing fault incidents according to an embodiment of the present invention.

Referring to the drawings, FIG. 1 is a flowchart of a method 100 for diagnosing a fault incident according to an embodiment of the present invention. Next, the embodiment will be described in detail in conjunction with the accompany drawings.

In this embodiment, "a business logic" represents a combination of one or more independent applications which can complete a certain task; "an application" represents a process for a certain application purpose which can be, for example, in the form of software; "a service" represents a function for supporting the execution of the application. Therefore, in the data center, one business logic can involve one or more applications, one or more services, one or more operating systems and one or more physical machines.

As shown in FIG. 1, at step 101, during the execution of the business logic, log chips corresponding to the execution process of the business logic are identified in the log file of the respective nodes which executes the business logic. In the data center, when a certain business logic is executed, each of the applications, services, operating systems involved in the business logic will perform the associated process. The business logic has several business elements which are generally deployed at the different nodes. The execution process of the business logic passes through every business element and its corresponding node sequentially in a certain order. When the execution process of the business logic proceeds to a node, the codes which are injected into the node in advance are run and the log is written at a specified time. In this embodiment, besides recording information about the execution process of the business logic at the node, the recorded information (log chips) is also identified to distinguish the information corresponding to the execution processes of the different business logics from one another. In one embodiment, the log chips are identified by writing an identifier of the business logic into the corresponding log chip. Specifically, when the codes associated with the business logic are run at a node, the identifier of the business logic is cached into the node. Then, at the time of writing the log, the identifier of the business logic is read out and written into the corresponding log chip.

In this way, by step 101, the information of the business logic can be dynamically written into the log file of the respective nodes. Thus, the dependency relationships between the applications and/or between the services can also be embodied in the log file correspondingly.

It should be appreciated for a person skilled in the art that step 101 is associated with the processing of the log file and is not necessarily included in the method of this embodiment.

At step 102, a determination is made as to whether a fault incident happened in the data center. Generally, when a fault happened at some application, server, network device and the like in the data center, an incident report or alert will be generated accordingly. Thus, occurrence of the fault incident can be monitored by monitoring whether the incident report or alert is generated.

If the fault incident did not occur in the data center, then the data center is further monitored to determine if a fault incident occurred in the data center in step 102.

If, however, the fault incident happened in the data center, then, at step 103, the business logic being executed in the node where the fault incident happened is determined. The node having the fault incident can be, for example, an application, a server, a network device and the like.

Then, at step 104, the log files associated with the execution process of the business logic determined at step 103 are selected based on a management model corresponding to the data center, where the management model reflects deployment and application dependency of business logics in the data center.

In this embodiment, the management model is established when the data center is deployed. The management model can comprise the following information:

1) a business logic deploying chain, which, for each of the business logics in the data center, records the nodes associated with the business logic, these nodes comprise an application, a service, an operating system and a physical machine; the business logic deploying chain reflects the deployment of the business logics in the data center; and 2) an application depending chain, which records the dependency relationships between the applications and/or between the services, and reflects the application dependency in the data center.

Further, the management model can reflect a physical topology structure of the data center. In this case, the management model further comprises the following information:

3) a topology chain, which records the physical topology structure of the data center, and the physical topology structure comprises the physical machines and their geographical locations.

With such management model, the deployment, dependency relationships of the business logics and the physical topology structure of the data center can be comprehensively reflected.

Figure 2:
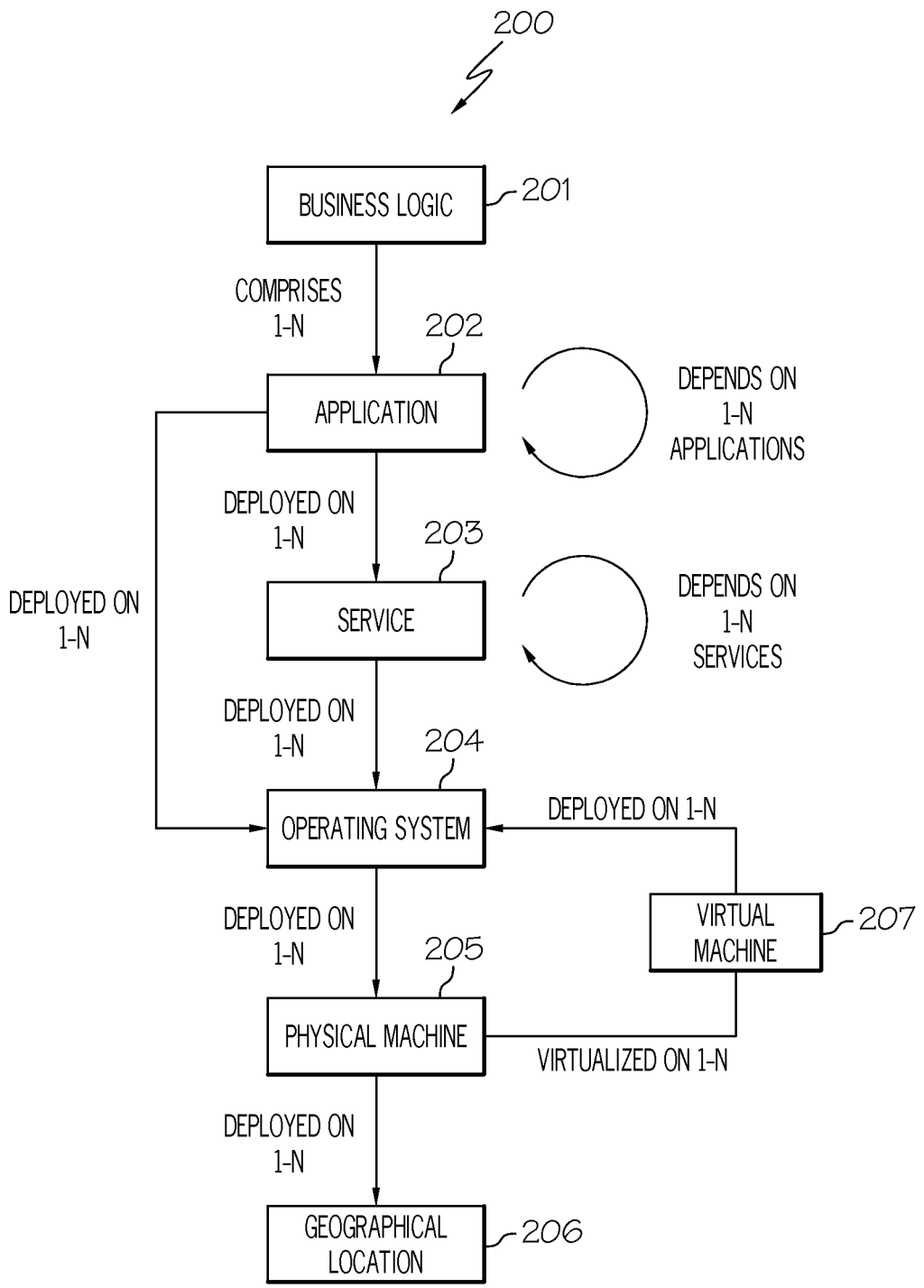
FIG. 2 is a diagram of an example of a management model of the data center used in an embodiment of the present invention.

FIG. 2 illustratively shows an example of a management model 200 of the data center used in an embodiment of the present invention. For clarity, only one business logic 201 in the data center is shown. As shown in FIG. 2, business logic 201 can comprise at least one application 202; the at least one application 202 can be deployed on at least one service 203 or directly deployed on at least one operating system 204, or can depend on at least one other application 202. The at least one service 203 can be deployed on at least one operating system 204, or can depend on at least one other service 203. The at least one operating system 204 can be deployed on at least one physical machine 205. The at least one physical machine 205 can be located in at least one geographical location 206. In FIG. 2, it is also shown that there is at least one virtual machine 207 virtualized on physical machine 205, and the at least one virtual machine 207 can be deployed on at least one operating system 204. In management model 200 shown in FIG. 2, the relationship between physical machine 205 and geographical location 206 reflects the physical topology structure of the data center, and the relationship between other nodes reflects the deployment and the dependency relationship of the business logics in the data center.

Referring to FIG. 2, in conjunction with FIG. 1, in case that management model 200 comprises the business logic deploying chain and the application depending chain, at step 104 \, firstly, the nodes associated with the execution process of the business logic (i.e., the related applications, services, operating systems and physical machines) are obtained based on the business logic deploying chain in the management model, and then the log files of these nodes are obtained. Then, for each of the obtained related applications, the application depending chain in the management model is traversed to obtain other applications and/or services on which the application depends, and then the log files of these other applications and/or services are obtained. Then, for each of the other applications, the nodes associated with the other applications are obtained based on the business logic deploying chain, and the log files of these nodes are also obtained. Thus, according to the above steps, all the log files associated with the execution process of the business logic determined in step 103 can be found.

Further, in case that management model 200 also comprises the topology chain, the topology chain is traversed to determine whether the physical topology structure of the data center is changed. When it is determined that the physical topology structure is changed, the node(s) causing the change would be written into the specific log file which records the change of the physical topology.

Then, at step 105, the fault incident is diagnosed based on the selected log files.

In this embodiment, at first, the log chips corresponding to the execution process of the required business logic is obtained from the selected log files. Generally, the log file records the information on the execution process of all the business logics relevant to the corresponding node at the node. As mentioned above, the identifier of the business logic is also written into its log file, therefore, the information (log chips) about the execution process of each business logic can be identified by the identifier of the business logic. Thus, for each log file, the corresponding log chip can be obtained from the log file based on the identifier of the business logic.

Next, the obtained log chips are ordered to obtain a sequence of log chips. In this embodiment, the log chips can be ordered in execution sequence of the business logic. Then, for the ordered log chips, each log chip is checked to find out the error log chip. In one embodiment, each log chip is compared to the correct log chip stored on the corresponding node. If the log chip is different from the correct one, the log chip is determined as the error log chip.

Alternatively, in another embodiment, an abnormal keyword is looked up in each log chip. If the abnormal keyword exists in a log chip, the log chip is determined as the error log chip.

It should be noted that, for a person skilled in the art, other methods may also be used to determine the error log chip.

In addition, the root cause of the fault incident can further be determined based on the determined error log chips. In this embodiment, the error log chips can be parsed based on a pre-determined rule so as to determine the root cause of the fault incident.

Generally, the rule for diagnosing the fault cause is stored in a database. The rule can be, for example, the last error log chip in the sequence of log chips is determined as the root cause of fault incident; if the error log chip indicates "URL resource unavailable" (the error code is http 404), the error log chip is determined as the root cause; if the error log chip indicates "service is unavailable" (the error code is http 500), the subsequent error log chip is parsed; and so on. Those skilled in the art can appreciate that the root cause of the fault incident can be determined by using an existing expert diagnosis system.

It can be seen from the above description that the method for diagnosing fault incidents of this embodiment utilizes the management model corresponding to the data center to select the log files associated with the execution process of the business logic, and because the management model reflects the deployment and application dependency of the data center, the fault incident can be automatically and rapidly diagnosed. Furthermore, the root cause of the fault incident can be rapidly and accurately determined by writing the information of the business logics and the dependency relationships between the applications into the log files and providing a sequence of the error log chips to analyze the root cause.

Figure 3A:
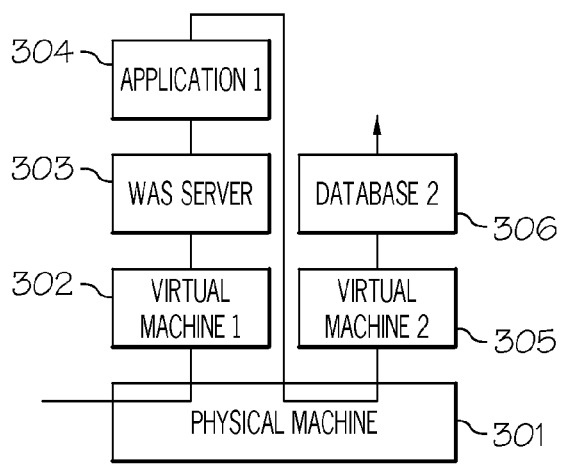
FIGS. 3A-3C are diagrams of an example for illustrating the method for diagnosing a fault incident shown in FIG. 1 in accordance with an embodiment of the present invention.
Figure 3B:
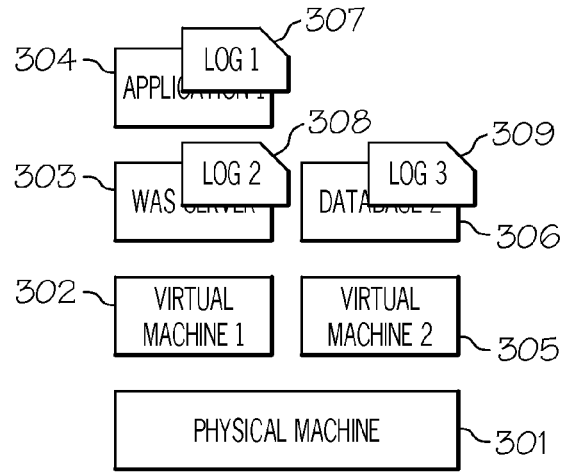
Figure 3C:
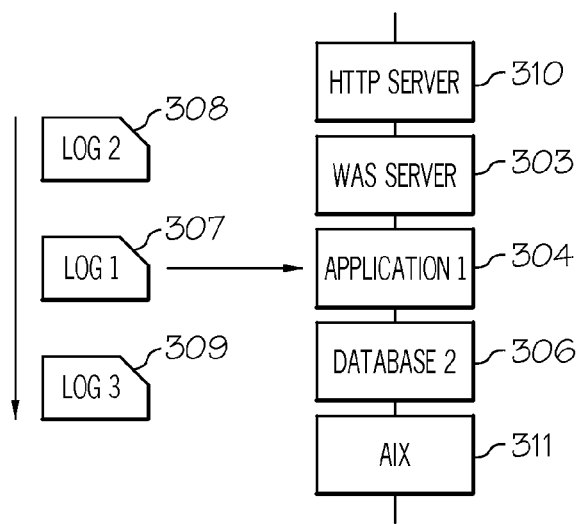

FIGS. 3A-3C illustratively shows an example of method 100 for diagnosing fault incidents shown in FIG. 1, where FIG. 3A shows a layer structure and an execution sequence of the business logic, FIG. 3B shows the relevant log files, and FIG. 3C shows the obtained sequence of the relevant log chips in accordance with an embodiment of the present invention.

As shown in FIG. 3A, the business logic is executed in the execution sequence of the physical machine 301—the virtual machine 1 302—the WebSphere Application Server (WAS) server 303—the application 1 304—the physical machine 301—the virtual machine 2 305—the database 2 306. During the execution, the identifier of the business logic is written into the log file of each node. If a fault incident happened at the HTTP server, the log files associated with the execution process of the business logic are found according to the management model, as shown in FIG. 3B, the log files Log 1 307, Log 2 308 and Log 3 309 are from application 1 304, WAS server 303 and database 2 306, respectively. Then, the relevant log chips are obtained from these log files based on the identifier of the business logic and are ordered in execution sequence of the business logic, the obtained sequence of log chips is shown in FIG. 3C. These log chips are checked sequentially to obtain the error log chips, where the error log chip at the HTTP server 310 is "HTTP 500" which indicates that the "HTTP request is unavailable," the error log chip at WAS server 303 indicates a "transaction rollback," the error log chip at application 1 304 indicates a "connection error," the error log chip at database 2 306 indicates a "table space full error," and the error log chip at the AIX operating system 311 indicates a "file system full error." Then, the root cause of the fault incident is determined based on these error log chips. In the above sequence of error log chips, the first is "HTTP 500," according to the above described rule, the subsequent error log chip needs to be further parsed, and thus the root cause of the fault incident is finally determined as a "file system full error."

Figure 4:
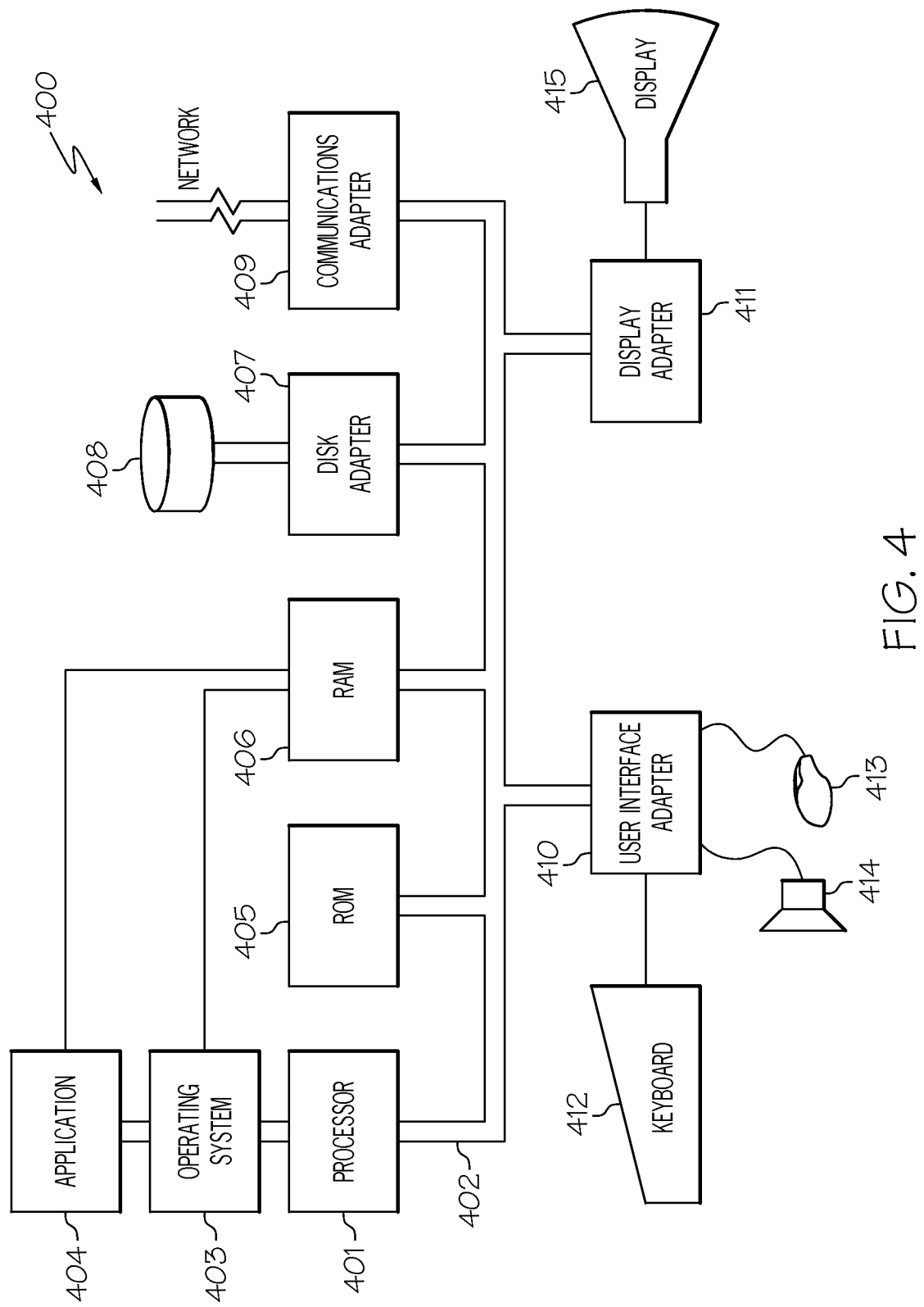
FIG. 4 depicts an embodiment of a hardware configuration of a computer system which is representative of a hardware environment for practicing the present invention.

FIG. 4 depicts an embodiment of a hardware configuration of a computer system 400 which is representative of a hardware environment for practicing the present invention. Referring to FIG. 4, computer system 400 has a processor 401 coupled to various other components by system bus 402. An operating system 403 may run on processor 401 and provide control and coordinate the functions of the various components of FIG. 4. An application 404 in accordance with the principles of the present invention may run in conjunction with operating system 403 and provide calls to operating system 403 where the calls implement the various functions or services to be performed by application 404. Application 404 may include, for example, an application for diagnosing a fault incident in a data center as discussed above.

Referring again to FIG. 4, read-only memory ("ROM") 405 may be coupled to system bus 402 and include a basic input/output system ("BIOS") that controls certain basic functions of computer device 400. Random access memory ("RAM") 406 and disk adapter 407 may also be coupled to system bus 402. It should be noted that software components including operating system 403 and application 404 may be loaded into RAM 406, which may be computer system's 400 main memory for execution. Disk adapter 407 may be an integrated drive electronics ("IDE") adapter that communicates with a disk unit 408, e.g., disk drive.

Computer system 400 may further include a communications adapter 409 coupled to bus 402. Communications adapter 409 may interconnect bus 402 with an outside network (not shown) thereby allowing computer system 400 to communicate with other similar devices.

I/O devices may also be connected to computer system 400 via a user interface adapter 410 and a display adapter 411. Keyboard 412, mouse 413 and speaker 414 may all be interconnected to bus 402 through user interface adapter 410. Data may be inputted to computer system 400 through any of these devices. A display monitor 415 may be connected to system bus 402 by display adapter 411. In this manner, a user is capable of inputting to computer system 400 through keyboard 412 or mouse 413 and receiving output from computer system 400 via display 415 or speaker 414.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," 'module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the C programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the function/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the function/acts specified in the flowchart and/or block diagram block or blocks.

Figure 5:
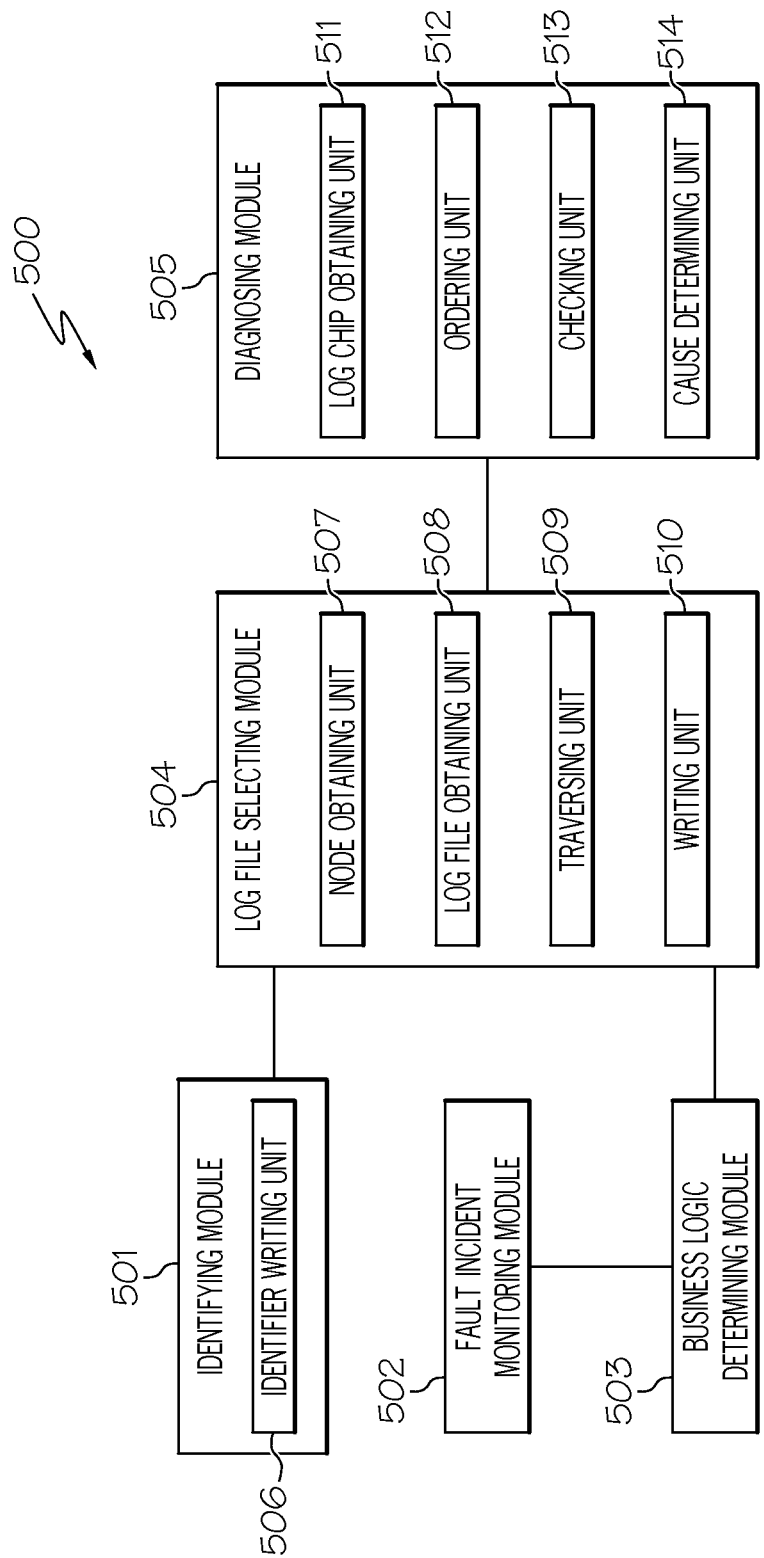
FIG. 5 illustrates the software components used for diagnosing a fault incident according to an embodiment of the present invention.

FIG. 5 illustrates the software components used for diagnosing a fault incident according to an embodiment of the present invention. In one embodiment, these software components are the components or modules of the program for diagnosing a fault incident, where the program may reside in application 404 (FIG. 4).

Now referring to FIG. 5, the software modules include an identifying module 501 which identifies, during the execution of the business logic, the log chips corresponding to the execution process of the business logic in the log file of the respective nodes which execute the business logic; a fault incident monitoring module 502 which monitors whether the fault incident happened in the data center; a business logic determining module 503 which determines the business logic being executed in the node where the fault incident happened when the occurrence of the fault incident is monitored by the fault incident monitoring module 502; a log file selecting module 504 which selects the log files associated with the execution process of the business logic determined by the business logic determining module 503 based on the management model corresponding to the data center, where the management model reflects the deployment and application dependency of the business logics in the data center; and a diagnosing module 505 which diagnoses the fault incident based on the selected log files.

In one embodiment of the present invention, during the execution of the business logic, the identifying module 501 identifies the log chips corresponding to the execution process of the business logic in the log file of the respective nodes executing the business logic. As mentioned above, in order to write the business logic and the dependency relationships between the applications and/or between the services into the log files, when the business logic is executed, besides writing the information associated with the execution process into the log files, this information (i.e., the log chips) are also identified by the identifying module 501 at the nodes such as the application/service involved into the business logic. In one embodiment, the identifying module 501 can comprise an identifier writing unit 506 which writes the identifier of the business logic into the corresponding log chips. Specifically, the identifier of the business logic is first cached into the node, and then it is written into the corresponding log chips of the log file of the node by the identifier writing unit 506 when writing the log.

The fault incident monitoring module 502 can monitor the occurrence of the fault incident in the data center by monitoring the receipt of the incident report or the generation of the fault alert. When the fault incident monitoring module 502 monitors the occurrence of the fault incident, the business logic determining module 503 would determine the business logic being executed in the node where the fault incident happened, and then the log file selecting module 504 selects the log files associated with the execution process of the determined business logic based on the management model corresponding to the data center.

As mentioned above, the management model reflects the deployment and the application dependency of the business logics and the physical topology structure of the data center, and comprises the business logic deploying chain, the application depending chain and the topology chain. The business logic deploying chain records the nodes associated with each business logic in the data center, including the applications, the services, the operating systems and the physical machines. The application depending chain records the dependency relationships between the applications and/or between the services. The topology chain records the physical topology structure of the data center, that is, the physical machines and their geographical locations. Therefore, embodiments of the present invention can further comprise a model establishing a module which establishes the management model of the data center when deploying the data center.

In case that the management model only comprises the business logic deploying chain and the application depending chain, in the log file selecting module 504, a node obtaining unit 507 obtains the nodes associated with the business logic based on the business logic deploying chain in the management model, and a log file obtaining unit 508 obtains the log files of these nodes. Next, for each application in the obtained nodes associated with the business logic, a traversing unit 509 traverses the application depending chain in the management model to obtain other applications and/or services on which the application depends, and the log file obtaining unit 508 obtains the log files of the other applications and/or services. Then, for each of the obtained other applications, the node obtaining unit 507 obtains the nodes associated with each of the other applications based on the business logic deploying chain in the management model. Then, the log files of these nodes are obtained by the log file obtaining unit 508.

In case that the management model further comprises the topology chain, the traversing unit 509 will further traverse the topology chain to determine whether the physical topology structure of the data center is changed. When it is determined that the physical topology structure of the data center is changed, the node(s) causing the change will be written into a log file specific to record the change of the physical topology structure by a writing unit 510 in log file selecting module 504.

When log file selecting module 504 selects the log files associated with business logic, diagnosing module 505 performs diagnosis on the fault incident based on these log files.

In diagnosing module 505, a log chip obtaining unit 511 obtains the log chips corresponding to the execution process of the business logic from these log files. In this embodiment, log chip obtaining unit 511 obtains, for each of the log files, the log chips corresponding to the execution process of the business logic from the log file based on the identifier of the business logic. Then, an ordering unit 512 orders the obtained log chips in execution sequence of the business logic.

For the ordered log chips, a checking unit 513 checks these log chips to find out the error log chips. In one embodiment, in checking unit 513, a comparing unit compares each of the log chips to the correct log chip stored on the corresponding node, and a determining unit determines the log chip different from the corresponding correct log chip as the error log chip. In another embodiment, in checking unit 513, a lookup unit looks up an abnormal keyword in each log chip, and then a determining unit determines the log chip having the abnormal keyword as the error log chip. Of course, a person skilled in the art will readily recognize that other methods for determining the error log chip can also be used.

In addition, diagnosing module 505 can further comprise a cause determining unit 514 which determines the root cause of the fault incident according to the error log chips found by checking unit 513. In this embodiment, cause determining unit 514 parses the error log chips based on a pre-determined rule to determine the root cause of the fault incident. In one embodiment, cause determining unit 514 can use an existing expert diagnosis system.

It should be noted that the software components for diagnosing fault incident in a data center of the present embodiment is operable to implement the method for diagnosing fault incident in a data center as shown in FIG. 1.

Further, the software components of this embodiment can be disposed within the data center. In addition, the software components can also be disposed separately from the data center. In this case, identifying module 501 and fault incident monitoring module 502 are disposed within the data center, and fault incident monitoring module 502 may be coupled to the business logic determining module 503 via various forms of communication.

Although the method, computer program product and apparatus for diagnosing a fault incident in a data center of the present invention have been described through some exemplary embodiments, these embodiments are not exhaustive, and those skilled in the art can realize various changes and modifications within the spirit and scope of the invention. Therefore, the present invention is not limited to these embodiments, the scope of which is only defined by the appended claims.

The invention claimed is:

1. A method for diagnosing a fault incident in a data center, the method comprising:
   monitoring whether a fault incident happened in the data center;
   determining a business logic being executed in a node where the fault incident happened in response to the fault incident happening in the data center;
   selecting log files associated with an execution process of the business logic based on a management model corresponding to the data center, the management model reflecting deployment and application dependency of business logics in the data center; and
   diagnosing, by a processor, the fault incident based on the log files.

2. The method according to claim 1, further comprising:
   establishing the corresponding management model when deploying the data center, wherein the management model comprises:
   a business logic deploying chain which, for each of the business logics in the data center, records nodes associated with the business logic, wherein the node is an application, a service, an operating system or a physical machine; and
   an application depending chain which records dependency relationships between applications and/or between services.

3. The method according to claim 2, wherein said selecting log files associated with the execution process of the business logic comprises:
   obtaining the nodes associated with the business logic based on the business logic deploying chain;
   obtaining the log files of the nodes associated with the business logic;
   traversing the application depending chain for the applications in the nodes associated with the business logic to obtain other applications and/or services on which the applications depend;
   obtaining the log files of the other applications and/or services;
   for the other applications, obtaining the nodes associated with the other applications based on the business logic deploying chain; and
   obtaining the log files associated with the other applications.

4. The method according to claim 3, wherein the management model further comprises:
   a topology chain which records a physical topology structure of the data center, the physical topology structure comprising physical machines and their geographical locations;
   wherein said selecting log files associated with the execution process of the business logic further comprises:
      traversing the topology chain to determine whether the physical topology structure of the data center is changed; and
      writing the nodes causing the change into a log file for recording change of the physical topology structure.

5. The method according to claim 1, wherein said diagnosing the fault incident based on the log files comprises:
   obtaining log chips corresponding to the execution process of the business logic from the selected log files;
   ordering the log chips; and
   checking the log chips to find error log chips.

6. The method according to claim 5, wherein said diagnosing the fault incident based on the log files further comprises:
   determining a root cause of the fault incident according to the error log chips.

7. The method according to claim 6, wherein said determining the root cause of the fault incident comprises:
   parsing the error log chips based on a pre-determined rule to determine the root cause of the fault incident.

8. The method according to claim 5 further comprising:
   during the execution of the business logic, identifying the log chips corresponding to the execution process of the business logic in the log files of the respective nodes executing the business logic.

9. The method according to claim 8, wherein said identifying the log chips corresponding to the execution process of the business logic in the log files of the respective nodes executing the business logic comprises:
   writing an identifier of the business logic into the corresponding log chips.

10. The method according to claim 9, wherein said obtaining log chips corresponding to the execution process of the business logic from the selected log files comprises:
   for each of the log files, obtaining the corresponding log chips from the log file based on the identifier of the business logic.

11. The method according to claim 5, wherein said ordering the log chips comprises:
   ordering the log chips in execution sequence of the business logic.

12. The method according to claim 5, wherein said checking the log chips to find the error log chips comprises:
   comparing each of the log chips to a correct log chip stored on the corresponding node; and
   determining the log chip different from the corresponding correct log chip as the error log chip.

13. The method according to claim 5, wherein said checking the log chips to find the error log chips comprises:
   looking up abnormal keywords in the log chips; and
   determining the log chip having the abnormal keyword as the error log chip.

14. A computer program product embodied in a computer readable storage medium device for diagnosing a fault incident in a data center, the computer program product comprising the programming instructions for:
   monitoring whether a fault incident happened in the data center;
   determining a business logic being executed in a node where the fault incident happened in response to the fault incident happening in the data center;
   selecting log files associated with an execution process of the business logic based on a management model corresponding to the data center, the management model reflecting deployment and application dependency of business logics in the data center; and
   diagnosing the fault incident based on the log files.

15. The computer program product according to claim 14 further comprising the programming instructions for:
   establishing the corresponding management model when deploying the data center, wherein the management model comprises:
      a business logic deploying chain which, for each of the business logics in the data center, records nodes associated with the business logic, wherein the node is an application, a service, an operating system or a physical machine; and
      an application depending chain which records dependency relationships between applications and/or between services.

16. The computer program product according to claim 15, wherein the programming instructions for selecting log files associated with the execution process of the business logic comprises the programming instructions for:
   obtaining the nodes associated with the business logic based on the business logic deploying chain;
   obtaining the log files of the nodes associated with the business logic;
   traversing the application depending chain for the applications in the nodes associated with the business logic to obtain other applications and/or services on which the applications depend;
   obtaining the log files of the other applications and/or services;
   for the other applications, obtaining the nodes associated with the other applications based on the business logic deploying chain; and
   obtaining the log files associated with the other applications.

17. The computer program product according to claim 16, wherein the management model further comprises:
   a topology chain which records a physical topology structure of the data center, the physical topology structure comprising physical machines and their geographical locations;
   wherein the programming instructions for selecting log files associated with the execution process of the business logic further comprises the programming instructions for:
      traversing the topology chain to determine whether the physical topology structure of the data center is changed; and
      writing the nodes causing the change into a log file for recording change of the physical topology structure.

18. The computer program product according to claim 14, wherein the programming instructions for diagnosing the fault incident based on the log files comprises the programming instructions for:
   obtaining log chips corresponding to the execution process of the business logic from the selected log files;
   ordering the log chips; and
   checking the log chips to find error log chips.

19. The computer program product according to claim 18, wherein the programming instructions for diagnosing the fault incident based on the log files further comprises the programming instructions for:

determining a root cause of the fault incident according to the error log chips.

20. The computer program product according to claim 18 further comprising the programming instructions for:

during the execution of the business logic, identifying the log chips corresponding to the execution process of the business logic in the log files of the respective nodes executing the business logic.

21. The computer program product according to claim 20, wherein the programming instructions for identifying the log chips corresponding to the execution process of the business logic in the log files of the respective nodes executing the business logic comprises the programming instructions for:

writing an identifier of the business logic into the corresponding log chips.

22. The computer program product according to claim 21, wherein the programming instructions for obtaining log chips corresponding to the execution process of the business logic from the selected log files comprises the programming instructions for:

for each of the log files, obtaining the corresponding log chips from the log file based on the identifier of the business logic.

23. The computer program product according to claim 18, wherein the programming instructions for ordering the log chips comprises the programming instructions for:

ordering the log chips in execution sequence of the business logic.

24. The computer program product according to claim 18, wherein the programming instructions for checking the log chips to find the error log chips comprises the programming instructions for:

comparing each of the log chips to a correct log chip stored on the corresponding node; and determining the log chip different from the corresponding correct log chip as the error log chip.

25. The computer program product according to claim 18, wherein the programming instructions for checking the log chips to find the error log chips comprises the programming instructions for:

looking up abnormal keywords in the log chips; and determining the log chip having the abnormal keyword as the error log chip.

\* \* \* \* \*